(12) United States Patent
Cameron et al.

(10) Patent No.: US 7,778,245 B2
(45) Date of Patent: Aug. 17, 2010

(54) METHOD AND APPARATUS FOR REMAPPING MODULE IDENTIFIERS AND SUBSTITUTING PORTS IN NETWORK DEVICES

(75) Inventors: Kevin Cameron, San Jose, CA (US); Gurumurthy V. S. Yeleswarapu, Santa Clara, CA (US); Mohan Kalkunte, Sunnyvale, CA (US); Srinivas Sampath, Sunnyvale, CA (US); Brian Baird, Pleasanton, CA (US)

(73) Assignee: Broadcom Corporation, Irvine, CA (US)

( * ) Notice: Subject to any disclaimer, the term of this patent is extended or adjusted under 35 U.S.C. 154(b) by 1087 days.

(21) Appl. No.: 10/985,031

(22) Filed: Nov. 10, 2004

(65) Prior Publication Data

US 2006/0013214 A1    Jan. 19, 2006

Related U.S. Application Data

(60) Provisional application No. 60/518,299, filed on Nov. 10, 2003, provisional application No. 60/553,974, filed on Mar. 18, 2004.

(51) Int. Cl.
*H04L 12/56* (2006.01)
(52) U.S. Cl. .................... 370/389; 370/395.3
(58) Field of Classification Search .............. 370/392, 370/466
See application file for complete search history.

(56) References Cited

U.S. PATENT DOCUMENTS

| 5,414,704 | A | 5/1995 | Spinney |
| 5,892,922 | A | 4/1999 | Lorenz |
| 5,940,596 | A | 8/1999 | Rajan et al. |
| 6,222,841 | B1 | 4/2001 | Taniguchi |
| 6,425,015 | B1 | 7/2002 | Jennings et al. |
| 2003/0048781 | A1* | 3/2003 | Pierson ..................... 370/389 |
| 2004/0151180 | A1* | 8/2004 | Hu et al. .................... 370/392 |
| 2004/0179536 | A1* | 9/2004 | Thubert et al. .......... 370/395.52 |
| 2005/0106941 | A1* | 5/2005 | Witchey ..................... 439/620 |
| 2005/0289306 | A1* | 12/2005 | Muthrasanallur et al. ... 711/158 |

FOREIGN PATENT DOCUMENTS

| WO | WO 99/00938 | 1/1999 |
| WO | WO 02/13446 A2 | 2/2002 |

* cited by examiner

*Primary Examiner*—Chirag G Shah
*Assistant Examiner*—Salvadore E Rivas

(57) ABSTRACT

A method of adjusting fields of a datagram in the handling of the datagram in a network device is disclosed. The method includes receiving a datagram, with the datagram having at least module identifier fields and port identifier fields, at a port of a network device, determining whether the received datagram is a unicast datagram, adjusting the module and port identifier fields of the datagram based on data registers in the network device when the received datagram is a unicast datagram and forwarding the datagram based on the module and port identifier fields of the datagram. The port of the network device is connected to a legacy device, where the legacy device has a reduced handling capacity when compared to the network device.

20 Claims, 5 Drawing Sheets

METHOD AND APPARATUS FOR REMAPPING MODULE IDENTIFIERS AND SUBSTITUTING PORTS IN NETWORK DEVICES

REFERENCE TO RELATED APPLICATIONS

This application claims priority of U.S. Provisional Patent Application Ser. No. 60/518,299, filed on Nov. 10, 2003, and U.S. Provisional Patent Application Ser. No. 60/553,974, filed on Mar. 18, 2004. The subject matter of these earlier filed applications is hereby incorporated by reference.

BACKGROUND OF THE INVENTION

1. Field of the Invention

The present invention relates to devices, software applications and networks that utilize data that is sent or received over data communication or computer networks. In particular, the present invention is directed to methods for handling datagrams between network devices that have differing capabilities. The processor and methods described provide the ability to control the forwarding of datagrams by remapping field data to allow for greater handling capacity.

2. Description of Related Art

As computer performance has increased in recent years, the demands on computer networks has significantly increased; faster computer processors and higher memory capabilities need networks with high bandwidth capabilities to enable high speed transfer of significant amounts of data. The well-known Ethernet technology, which is based upon numerous IEEE Ethernet standards, is one example of computer networking technology which has been able to be modified and improved to remain a viable computing technology.

Based upon the Open Systems Interconnect (OSI) 7-layer reference model, network capabilities have grown through the development of repeaters, bridges, routers, and switches, which operate with various types of communication media. Collectively, with respect to the present invention, all of these may be referred to as network devices. Switches, as they relate to computer networking and to Ethernet, are hardware-based devices which control the flow of datagrams, data packets or cells based upon destination address information which is available in each packet. A properly designed and implemented switch should be capable of receiving a packet and switching the packet to an appropriate output port at the maximum speed capability of the particular network.

Referring to the OSI 7-layer reference model discussed previously, the higher layers typically have more information. Various types of products are available for performing switching-related functions at various levels of the OSI model. Hubs or repeaters operate at layer 1, and essentially copy and "broadcast" incoming data to a plurality of spokes of the hub. Layer 2 switching-related devices are typically referred to as multiport bridges, and are capable of bridging two separate networks. Bridges can create a table of forwarding rules based upon which MAC (media access controller) addresses exist on which ports of the bridge, and pass packets that are destined for an address which is located on an opposite side of the bridge. Bridges typically utilize what is known as the "spanning tree" algorithm to eliminate potential data loops; a data loop is a situation wherein a packet endlessly loops in a network looking for a particular address. The spanning tree algorithm defines a protocol for preventing data loops. Layer 3 switches, sometimes referred to as routers, can forward packets based upon the destination network address. Layer 3 switches are capable of learning addresses and maintaining tables thereof which correspond to port mappings. Processing speed for layer 3 switches can be improved by utilizing specialized high performance hardware, and off loading the host CPU so that instruction decisions do not delay packet forwarding.

In addition, as new network devices are developed, new capabilities are developed in response to new issues that arise or have arisen with previous network devices. Some of these issues arise because customers of the prior network devices have certain requests or conditions that should be met or because new methodologies have been developed that are improvements over prior methodologies. Often times, the newer network devices must be integrated with the older network devices to provide the proper capacity, i.e., for example, a total number of ports in a combined amalgamation of devices having a certain throughput.

However, this may introduce difficulties in that while the newer devices are usually "backward compatible," the combination of devices can not necessarily utilize all of the benefits of the newer devices. One such issue occurs when an older network device has a more limited capacity in the number of other devices it can be connected to and a limited number of total ports that can be considered in making decisions on how to handle and forward received datagrams. Thus, there is a need in the prior art to determine methods that allow for greater functionality of combined chip sets and network devices are utilized together to achieve capacity and functionality objectives.

SUMMARY OF THE INVENTION

According to one embodiment of the invention, a method of adjusting fields of a datagram in the handling of the datagram in a network device is disclosed. The method includes receiving a datagram, with the datagram having at least module identifier fields and port identifier fields, at a port of a network device, determining whether the received datagram is a unicast datagram, adjusting the module and port identifier fields of the datagram based on data registers in the network device when the received datagram is a unicast datagram and forwarding the datagram based on the module and port identifier fields of the datagram. The port of the network device is connected to a legacy device, where the legacy device has a reduced handling capacity when compared to the network device.

Additionally, the module identifier fields may include a destination module identifier field and a source module identifier field and the step of adjusting the module and port identifier fields may include shifting at least one of the destination module identifier field and the source module identifier field by an offset value based on whether the datagram is received from the legacy device or destined for the legacy device. Also, the port identifier fields may include a destination port identifier field and a source port identifier field and the step of adjusting the module and port identifier fields may include shifting at least one of the destination port identifier field and the source port identifier field by an offset value based on whether the datagram is received from the legacy device or destined for the legacy device.

In addition, the legacy device may have a capacity to address a maximum of thirty-two modules and the step of adjusting the module and port identifier fields of the datagram may be performed to comply with the maximum address capacity of the legacy device. Also, the port of the network device may be a high speed port controlled through a high speed interface used to interconnect network devices together and the step of forwarding the datagram may include forwarding the datagram through the high speed interface to an interconnected legacy network device. Additionally, the datagram may be a data packet and the step of determining whether the received datagram is a unicast datagram may include determining whether the received packet is a unicast packet through examination of a field in a header of the data packet.

According to another embodiment, a network device configured to adjust fields of a datagram in the handling of the datagram is disclosed. The device includes receiving means for receiving a datagram, with the datagram having at least module identifier fields and port identifier fields, at a port of a network device, determining means for determining whether the received datagram is a unicast datagram, adjusting means for adjusting the module and port identifier fields of the datagram based on data registers in the network device when the received datagram is a unicast datagram and forwarding means for forwarding the datagram based on the module and port identifier fields of the datagram. The port of the network device is connected to a legacy device, where the legacy device has a reduced handling capacity when compared to the network device.

According to another embodiment, a network device configured to adjust fields of a datagram in the handling of the datagram is disclosed. The device includes at least one data port interface, in communication with at least a legacy port, for receiving and forwarding datagrams, with each of the datagrams having at least module identifier fields and port identifier fields, a datagram reader for determining whether the received datagrams are unicast datagrams and a datagram writer for writing adjusted module and port identifier fields to the datagram based on data registers in the network device when the received datagrams are determined to be unicast datagrams. The forwarding of the datagrams is based on the module and port identifier fields of the datagram and wherein the legacy port is connected to a legacy device, where the legacy device has a reduced handling capacity when compared to the network device.

These and other variations of the present invention will be described in or be apparent from the following description of the preferred embodiments.

BRIEF DESCRIPTION OF THE DRAWINGS

For the present invention to be easily understood and readily practiced, the present invention will now be described, for purposes of illustration and not limitation, in conjunction with the following figures.

DETAILED DESCRIPTION OF PREFERRED EMBODIMENTS

Figure 1:
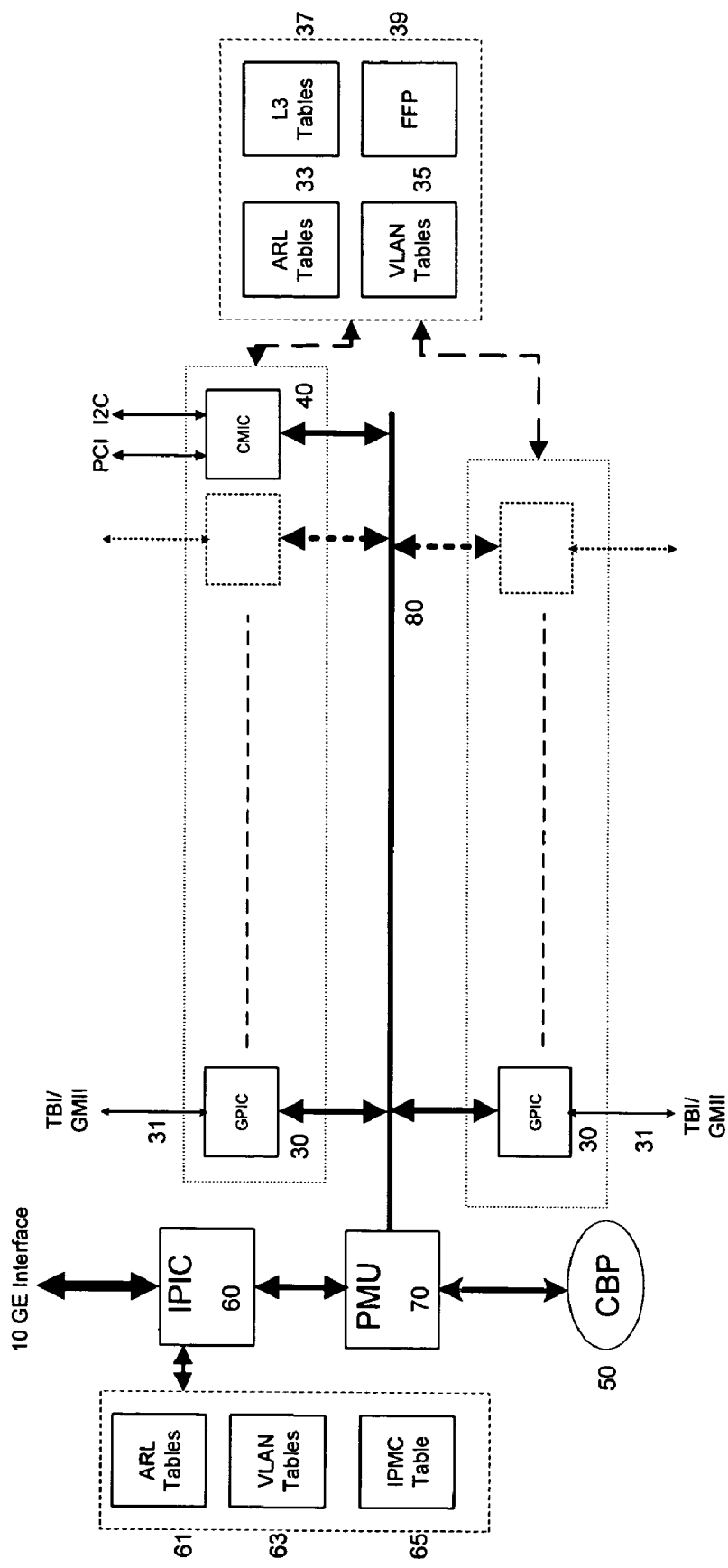
FIG. 1 illustrates a block diagram providing the basic elements of a network device, according to one embodiment of the present invention.

The present invention is directed, in one embodiment, to a network device that receives data and processes that data and may forward that data onto a destination based on attributes of that data. A general schematic of the network device is illustrated in FIG. 1. The following are the major blocks in the network device, according to at least one embodiment: Gigabit Port Interface Controller (GPIC) 30; Interconnect Port Interface Controller (IPIC) 60; CPU Management Interface Controller (CMIC) 40; Common Buffer Pool (CBP)/Common Buffer Manager (CBM) 50; Pipelined Memory Management Unit (PMU) 70; and Cell Protocol Sideband (CPS) Channel 80. The above components are discussed below. In addition, a Central Processing Unit (CPU) can be used as necessary to program the network device with rules which are appropriate to control packet processing. However, once the network device is appropriately programmed or configured, it operates, as much as possible, in a free running manner without communicating with CPU.

The Gigabit Port Interface Controller (GPIC) module interfaces to the Gigabit port 31. On the medium side it interfaces to the TBI/GMII or MII from 10/100 and on the fabric side it interfaces to the CPS channel 80. In one example, each GPIC supports at least one 1 Gigabit port or a 10/100 Mbps port. Each GPIC performs both the ingress and egress functions. The number of GPICs provided on the network device depends on the precise configuration of the device. Similarly, additional interconnect links to additional external devices and/or CPUs may be provided as necessary.

On the Ingress the GPIC supports, in one example, at least the following functions: 1) L2 Learning (both self and CPU initiated); 2) L2 Management (Table maintenance including Address Aging); 3) L2 Switching (Complete Address Resolution: Unicast, Broadcast/Multicast, Port Mirroring, 802.1Q/802.1p); 4) FFP (Fast Filtering Processor), including the IRULES Table); 5) a Packet Slicer; and 6) a Channel Dispatch Unit.

On the Egress the GPIC supports, in one example, at least the following functions: 1) Packet pooling on a per Egress Manager (EgM)/COS basis; 2) Scheduling; 3) HOL notification; 4) Packet Aging; 5) CBM control; 6) Cell Reassembly; 7) Cell release to FAP (Free Address Pool); 8) a MAC TX interface; and 9) Adds Tag Header if required.

The Interconnect Port Interface Controller (IPIC) 60 module, in one example, interfaces to CPS Channel 80 on one side and a high speed interface, called HIGIG interface, on the other side. The HIGIG is a XAUI interface, providing a total bandwidth of 10 Gbps, in a particular example, according to some embodiments.

The CPU Management Interface Controller (CMIC) 40 block is the gateway to the host CPU. In its simplest form, it provides sequential direct mapped accesses between the CPU and the network device. According to one example, the CPU has access to the following resources on chip: all MIB counters; all programmable registers; Status and Control registers; Configuration registers; ARL tables; 802.1Q VLAN tables; IP Tables (Layer-3); Port Based VLAN tables; IRULES Tables; and CBP Address and Data memory.

The bus interface can be a 66 MHz PCI. In addition, an I2C (2-wire serial) bus interface may be supported by the CMIC, to accommodate low-cost embedded designs where space and cost are a premium. CMIC can also support: both Master and Target PCI (32 bits at 66 MHz); DMA support; Scatter Gather support; Counter DMA; and ARL DMA.

The Common Buffer Pool (CBP) 50 is the on-chip data memory, according to one embodiment. Frames are stored in the packet buffer before they are transmitted out. The on-chip memory size is 1.5 Mbytes. The actual size of the on-chip memory is determined after studying performance simulations and taking into cost considerations. All packets in the CBP are stored as cells. The Common Buffer Manager (CBM) does all the queue management. It may be responsible for: assigning cell pointers to incoming cells; assigning PIDs (Packet ID) once the packet is fully written into the CBP; management of the on-chip Free Address Pointer pool (FAP); actual data transfers to/from data pool; and memory budget management.

When a port is in TurboGig mode, it can operate in speed in excess of 2.5 Gbps, in one example. The transmit IPG on the port should be at 64 bit times. The FFP support on the TurboGig is a subset of the masks. A total of 128 IRULES and 4 IMASKs are supported, in a particular embodiment, when the port is in TurboGig mode. A total of 16 meter-ds may be supported on the FFP.

The Cell Protocol Sideband (CPS) Channel 80 is a channel that "glues" the various modules together as shown in FIG. 1. The CPS channel actually includes 3 channels:
- a Cell (C) Channel: All packet transfers between ports occur on this channel;
- a Protocol (P) Channel: This is a synchronous to the C-channel and is locked to it. During cell transfers the message header is sent via the P-channel by the Initiator (Ingress/PMMU); and
- a Sideband (S) Channel: its functions are: CPU management: MAC counters, register accesses, memory accesses etc; chip internal flow control: Link updates, out queue full etc; and chip inter-module messaging: ARL updates, PID exchanges, Data requests etc. The side band channel is 32 bits wide and is used for conveying Port Link Status, Receive Port Full, Port Statistics, ARL Table synchronization, Memory and Register access to CPU and Global Memory Full and Common Memory Full notification.

When the packet comes in from the ingress port the decision to accept the frame for learning and forwarding is done based on several ingress rules. These ingress rules may be based on the Protocols and Filtering Mechanisms supported in the switch. The protocols which decide these rules are 802.1d (Spanning Tree Protocol), 802.1p and 802.1q. Extensive Filtering Mechanism with inclusive and exclusive Filters is supported. These Filters are applied on the ingress side and depending on the outcome different actions are taken. Some of the actions may involve changing the 802.1p priority in the packet Tag header, changing the Class-of-Service (CoS) Precedence field in the IP Header or changing the egress port.

Figure 3:
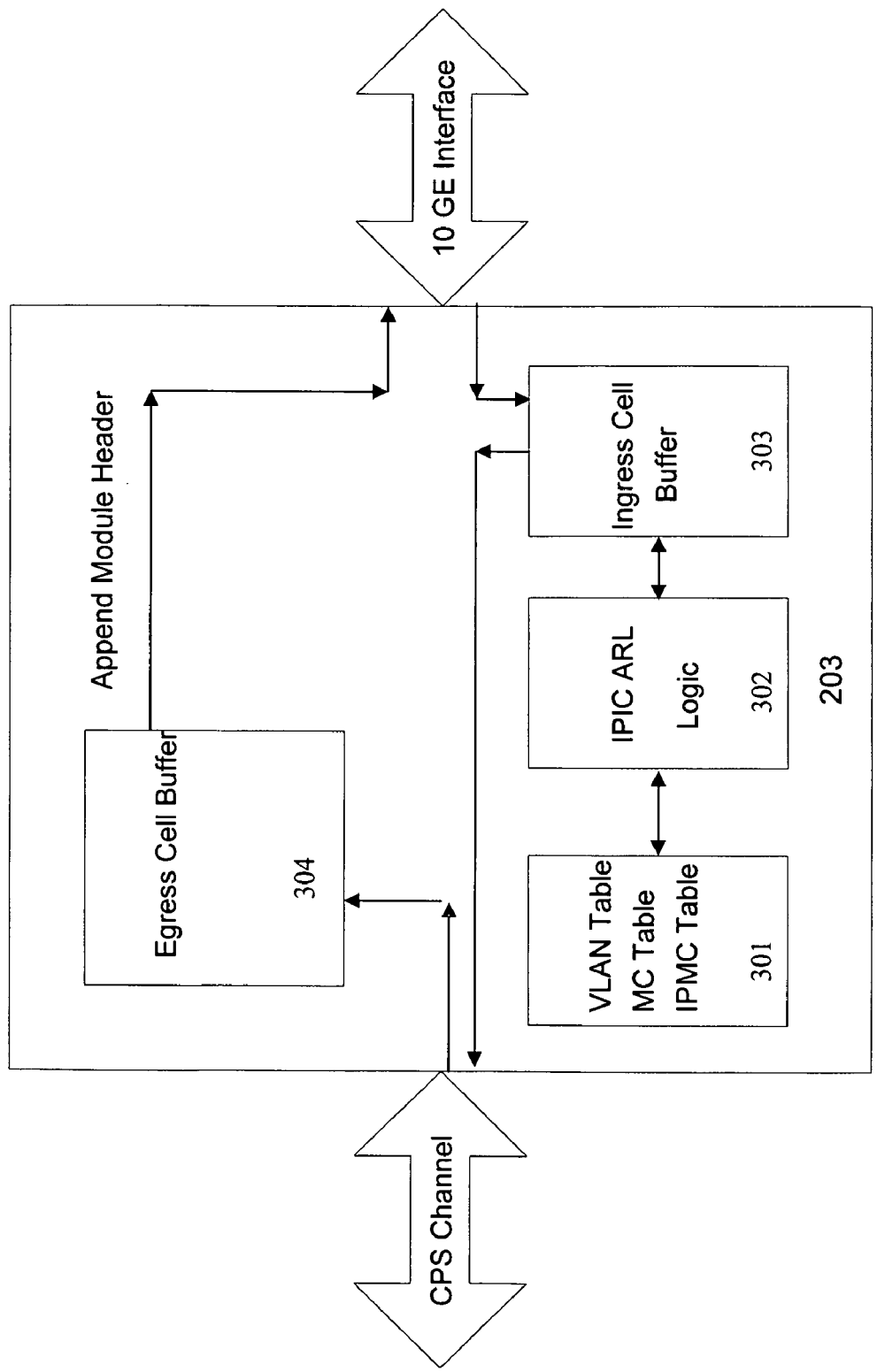
FIG. 3 provides a block diagram illustrating the structure of DLL, according to one embodiment of the present invention.

The Interconnect Port Interface Controller (IPIC) Module 60 or 203 is used, in one example, to interface the device of the present invention to other like devices through a cross-bar fabric or through a Ring. FIG. 3 below shows a switch of the present invention having components interfacing to an Interconnect Module (ICM). The IPIC module 203 interfaces to the CPS Channel 80 on one side and the 10-Gigabit Ethernet on the other side. The 10GE Interface is a high-speed data connection with a bandwidth up to 10 Gbps full duplex.

Figure 2:
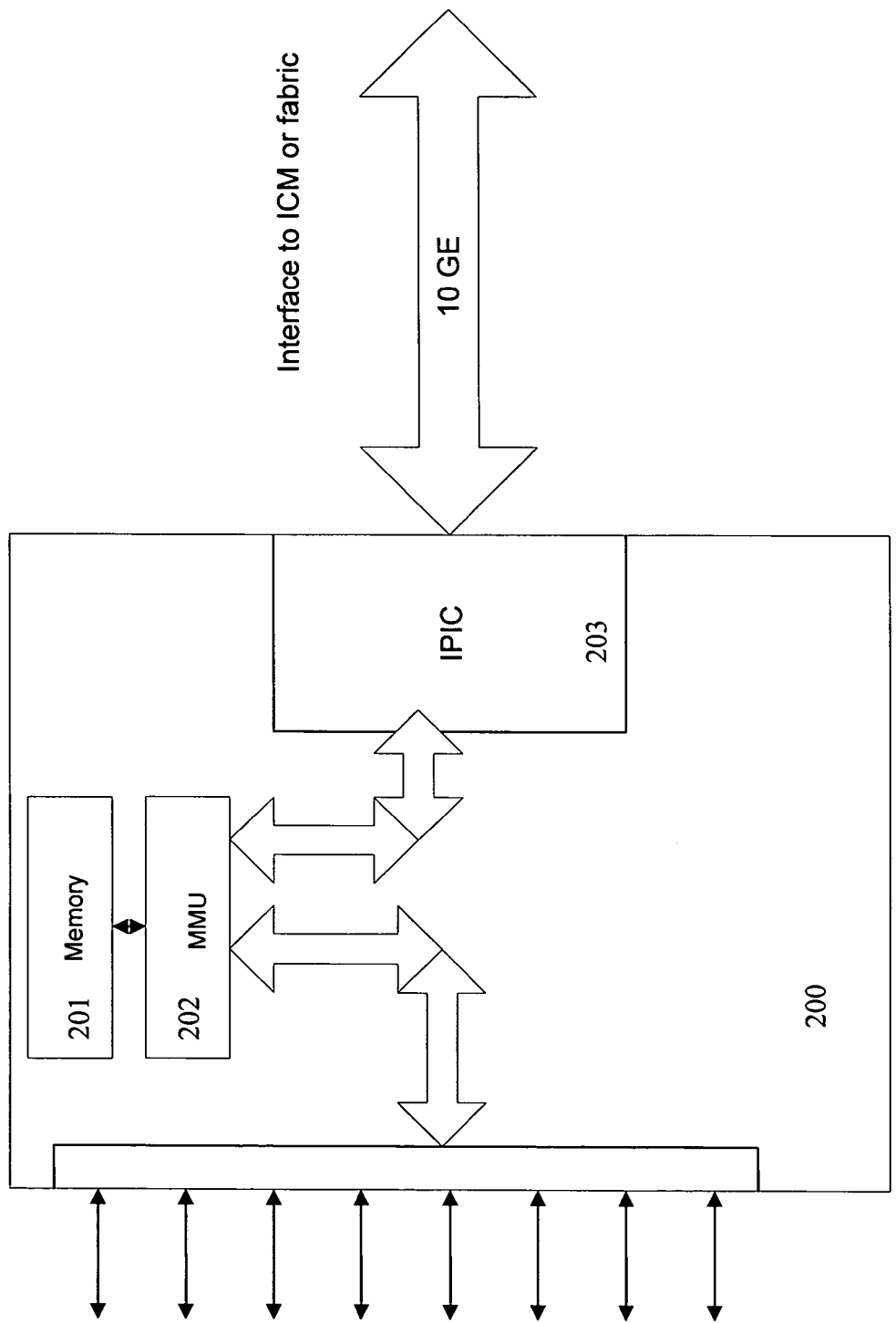
FIG. 2 provides a block diagram illustrating elements used to process packets by the network switch, according to one embodiment of the present invention.

The interaction between the IPIC 203 and the Memory Management Unit 202 and buffer memory 201 is illustrated in FIG. 2, and in FIG. 3 where the high level functions of the IPIC are described below. First, the IPIC 203 receives cells from the MMU 202 and sends the Frame out on the 10GE Interface. The egress function in the IPIC requests cells from the MMU 202 to transmit. If there are cells queued for the IPIC in the MMU, the MMU will send the cells to the IPIC. IPIC will also append the appropriate Module header. The IPIC gets the information to be appended in the Module Header from the P-Channel fields. This information includes Module Opcodes, Module Id Bitmap, Egress port, CoS, Source Trunk Group Id or Source port of the packet etc. The IPIC also strips the VLAN tag from the current position in the packet (after the SA) and will insert two bytes of VID+Priority+CFI in front of the Module Header. The IPIC then sends the Frame along with the constructed Module Header onto the 10GE Interface.

In a second function, the IPIC receives Frames from the 10GE and sends the cells on the CP Channels to the MMU after the Address Resolution is done. The Frame is received from the 10GE Interface. IPIC has a shallow buffer to store the frame. IPIC strips the two bytes of tag header and the Module Header. Module Header is the header appended to the frame by the Source Module. The Tag header is re-inserted in the packet after the SA along with the VLAN Type of 0x8100 (totally four bytes). IPIC goes through IPIC ARL Logic, which is described in the IPIC ARL Logic below. The Source MAC Address of the packet is learned in the IPIC ARL Table. The Source Module, Source Port and the VLAN ID of the packet is picked up from the Module Header which gets populated in the IPIC ARL Table.

If the packet is unicast (as indicated by the Module Opcode), the egress port is contained in the module header. This packet is forwarded to the egress port under the following conditions 1) M=0 and 2) M=1 and SMM=1. If the packet is a broadcast or an unknown unicast (DLF) that is identified by the Module Opcode, the packet is flooded to all members of the associated VLAN. The VLAN bitmap is picked up from the IPIC VTABLE. If the packet is Multicast and IPMC_DISABLE bit is NOT set, the egress port(s) is (are) picked up from the IPIC IPMC Table. If the packet is Multicast and IP_MC_DISABLE bit is set, the egress port(s) is(are) picked up from the IP IC MC Table. From the address resolution the egress port(s) is(are) decided and the Port Bitmap is constructed, the packet is sliced into 64 byte cells and these cells are sent to the MMU over the CP Channel. The Opcode value in the Module header is mapped to the Mod Opcode in the P-Channel. If the egress port is mirrored and the MTP is on another module, then the Port Bitmap will also include the IPIC port to be sent out. This packet will be sent to the Mirrored-to-port only.

The incoming packet from the 10GE is stored in the Shallow Buffer 303. After getting the first forty-eight bytes of the Packet plus eight bytes of the Module Header, the IPIC ARL Logic 302 sends the ARL Request to do the Address Resolution 301, only if the Opcode value in the Module Header is set to a non zero value, i.e. the packet is a Unicast, Multicast, Broadcast or a DLF. The ARL Logic for IPIC is quite different from that of any other ingress port. The differences include that the Packet starts after 8 bytes of the Module Header, in some network devices. In addition, the IPIC port should be programmed as a member of the PORT_BITMAP if the VLAN spans multiple modules.

In addition, the Module header contains the information whether it is a Control Frame or Data Frame. The Control Frame is always sent to the CPU after stripping the Module Header. The Trunk Group Identifier of the port is picked up from the Module Header and for the unicast packet where the Address Resolution is done by the Ingress Module/port, the egress port is picked up from the Egress port field of the Module Header. For Broadcast or DLF packet, the egress Port Bitmap is picked up from the IPIC VTABLE. For Multicast the egress Port Bitmap is picked up from IPIC MC Table. In case of IP Multicast the Port Bitmap is picked up from the IPIC IPMC Table. The L2 bitmap in IPMC and Mcast should be members of the VLAN. For every egress port in IPMC L3 bitmap, the L3 interface address and the VLAN ID should be programmed in the egress port(s).

The HIGIG protocol provides a standard mechanism to interconnect network devices to form a single system. Such a system can be several stacked devices or a chassis system with several switch blades and fabric switch blades. The HIGIG protocol enables the forwarding of packets for unicast, broadcast, layer 2 multicast, IP multicast, unknown unicast and control frames. In addition, it also allows port monitoring across multiple switches and also eternalizes packet classification information from the switch.

In older families of devices (legacy devices), the number of modules and ports that can be supported is limited by the size of the source and destination module ID fields in the HIGIG header, which are either five or six bits wide. Therefore, a maximum of thirty-two or sixty-four modules could be addressed. Starting with newer network devices (newer devices), the module ID fields are seven bits wide; thereby allowing up to 128 modules to be addressed. In order to use the legacy devices in systems with more than thirty-two or sixty-four modules, the newer devices provide a mechanism to map module IDs between the older five or six bit address space (32-space or 64-space) and the newer seven bit space (128-space).

In order to simplify the remaining discussion, the term "64-space" will also refer to "32-space." The concepts apply equally to 32-space as long as the programmer remembers to limit the module-IDs to/from 32-space devices to five bits.

In 128-space, each module is given a unique identifier from 0-127 (modid). When a newer device is connected to a 128-space aware port, no modid mapping is needed so the MODID remapping feature for that port is disabled by software (this is the reset default).

In 64-space, the mapping is based on the fact that some devices do not use all of the thirty-two ports which are allowed by the five bit port ID in the HIGIG header. So, two or more devices can be mapped into a "virtual" module which has all of the ports for the actual devices remapped into the thirty-two allowable port indices. The newer devices allow up to four modules to share a single module ID in 32-space as long as the total number of ports does not exceed thirty-two. This mechanism should be enabled only on the ports of the newer devices which are directly connected to legacy devices.

The following naming conventions are used in this discussion: register(port).field references a field in a register in a port, memory(port)(n).field references a field in a memory at location 'n' in a port, 128_field references a field in 128 space and 64_field references a field in 64-space.

The mapping, according to one embodiment, between 64-space and 128-space is controlled by one register (MODMAP_CTRL), TABLE 1, and two tables (ING_MOD_MAP and EGR_MOD_MAP), TABLES 2 and 3:

TABLE 1

MODMAP_CTRL Register (1 per port)

| Name | Bits | Description |
|---|---|---|
| ING_MAP_EN | 1 | Enable 64 (or 32) space to 128-space mapping in the ingress<br>0 = Disable mapping (default)<br>1 = Enable mapping |
| EGR_MAP_EN | 1 | Enable 128-space to 64 (or 32)-space mapping in the egress<br>0 = Disable mapping (default)<br>1 = Enable mapping |
| MODID_OFFSET | 7 | ModuleID offset.<br>When ING_MAP_EN is set, this value is added to the SRC_MODID in 64 (or 32) space of HiGig header for packets arriving from the attached legacy part. When EGR_MAP_EN is set, this value is subtracted from the DST_MODID in 128 space in the HiGig header before packets are transmitted to the attached legacy part. |

TABLE 1-continued

MODMAP_CTRL Register (1 per port)

TABLE 2

ING_MOD_MAP Table
(1 table per port, 64 entries, indexed by 6 bit HiGig DST_MODID)

| Field Name | Bits | Description |
|---|---|---|
| MOD_A | 7 | 128-space DST_MODID to use if the HiGig DST_PORT in 64-space is less than or equal to THRESH_A |
| MOD_B | 7 | 128-space DST_MODID to use if the HiGig DST_PORT in 64 space is less than or equal to THRESH_B and greater than THRESH_A |
| MOD_C | 7 | 128-space DST_MODID to use if the HiGig DST_PORT in 32 space is less than or equal to THRESH_C and greater than THRESH_B |
| MOD_D | 7 | 128-space DST_MODID to use if the HiGig DST_PORT is greater than THRESH_C |
| PORTOFF_A | 5 | Offset to add to the 64-space DST_PORT in the HiGig, if it is less than or equal to THRESH_A and arrive at a 128-space DST_PORT |
| PORTOFF_B | 5 | Offset to add to the 64-space DST_PORT in the HiGig if it is less than or equal to THRESH_B but greater than THRESH_A |
| PORTOFF_C | 5 | Offset to add to the 64-space DST_PORT in the HiGig if it is less than or equal to THRESH_C but greater than THRESH_B |
| PORTOFF_D | 5 | Offset to add to the 64-space DST_PORT in the HiGig if it is greater than THRESH_C |
| THRESH_A | 5 | Value to compare the 64-space DST_PORT in the HiGig to derive the 128-space values. If the DST_PORT is less than or equal to this value, then MOD_A and PORTOFF_A in this entry are used |
| THRESH_B | 5 | Value to compare the 64-space DST_PORT in the HiGig to derive the 128-space values. If the DST_PORT is less than or equal to this value and greater than THRES_A, then MOD_B and PORTOFF_B in this entry are used |
| THRESH_C | 5 | Value to compare the 64-space DST_PORT in the HiGig to derive the 128 space values. If the DST_PORT is less than or equal to this value and greater than THRES_B, MOD_C and PORTOFF_C in this entry are used, else MOD_D and PORTOFF_D are used |

TABLE 3

EGR_MOD_MAP Table
(1 table per port, 128 entries, indexed by 7 bit HiGig SRC_MODID)

| Field Name | Bits | Description |
|---|---|---|
| MOD | 6 | 64 (or 32) space SRC_MODID to use to convert from 128-space to 64-space |
| PORTOFF | 5 | Offset which is added to the 128 space SRC_PORT_TGID to convert from 128-space to 64-space |

The conversion from 64-Space to 128-Space on the Ingress is discussed. The ING_MAP_EN bit of the MODMAP_CTRL register for a port is set to '1' when it is connected to a legacy device. For each packet received, the newer device ingress logic will convert the source and destination ModuleID and PortID fields in the HiGig header from 64-space to their 128-space equivalents.

The SRC_MODID field of the HIGIG header is replaced with the original SRC_MODID value added to the MODID_OFFSET field of the MODMAP_CTRL register. The SRC_PORT_TGID field is unchanged.

The first step in computing the 128-space DST_MODID and DST_PORT fields is to look up the ING_MOD_MAP table entry indexed by the 64-space DST_MODID field of the incoming HIGIG header. The 64-space DST_PORT field is then compared with the three thresholds from the table to select one of four pairs of 128-space DST_MODID and port offset (MOD_[A,B,C,D] and PORTOFF_[A,B,C,D]) (see the table description for more detail). The DST_MODID field of the HIGIG packet is replaced with the selected MOD_X from the table. The DST_PORT field of the HIGIG header is replaced by the result of the original DST_PORT field subtracted to the selected PORTOFF_X field. Note that this conversion is only performed for unicast packets. For non-unicast packet types, the DST_MODID and DST_PORT fields are not changed. The changes are also summarized in TABLE 4 below:

TABLE 4

| | |
|---|---|
| 128_SRC_MODID = | 64_SRC_MODID + MODMAP_CTRL.MODID_OFFSET |
| 128_SRC_PORT_TGID = | 64_SRC_PORT_TGID |
| 128_DST_MODID = | ING_MOD_MAP (64_DST_MODID).MOD_x |
| 128_DST_PORT = | 64_DST_PORT − ING_MOD_MAP (64_DST_MODID).PORTOFF_x where x is A, B, C or D based on threshold match |

It is noted that all further processing of the packet within the ingress uses the 128-space values for source and destination module and port Ids. For example, the unicast table is indexed by the 128-space DST_MODID that results from the computation described above. DST_MODID and DST_PORT fields are not changed for non-unicast packets. SRC_PORT_TGID is not mapped if it indicates a source trunk group, in which case bit 5 of this field will be set.

The conversion from 128-Space to 64-Space is discussed below. The EGR_MAP_EN bit of the MODMAP_CTRL register for a port is set to '1' when it is connected to a legacy device. For each packet that is egressed, the newer device egress logic will convert the source and destination ModuleID and PortID fields in the HIGIG header from 128-space to the 64-space equivalents.

For unicast packets, the DST_MODID field of the HIGIG header is replaced with the original (128-space) DST_MODID value minus the MODID_OFFSET field of the MODMAP_CTRL register. The DST_MODID field is not changed at the egress for non-unicast packet types. The DST_PORT field is never changed.

The first step in computing the 64-space SRC_MODID and SRC_PORT_TGID fields is to look up the EGR_MOD_MAP table entry indexed by the 128-space SRC_MODID field of the original HIGIG header. The SRC_MODID field in the header is replaced by that from the MOD field from the table. The SRC_PORT_TGID field in the header is replaced by the result of the addition of the original SRC_PORT_TGID with the value from the PORTOFF field from the table. Note that the SRC_PORT_TGID is not mapped if it indicates a source trunk group, in which case bit 5 of this field will be set. The changes are also summarized in TABLE 4 below:

TABLE 5

| | |
|---|---|
| 64_SRC_MODID = | EGR_MOD_MAP(128_SRC_MODID).MOD |
| 64_SRC_PORT_TGID = | 128_SRC_PORT_TGID + EGR_MOD_MAP (128_SRC_PORT_TGID).PORTOFF |
| 64_DST_MODID = | 128_SRC_MODID − MODMAP_CTRL.MODID_OFFSET |
| 64_DST_PORT = | 128_DST_PORT |

DST_MODID and DST_PORT fields are not changed for non-unicast packets. SRC_PORT_TGID is not mapped if originally in 64-space indicates a source trunk group, in which case bit 5 of this field will be set.

EXEMPLARY EXAMPLES

Figure 4:
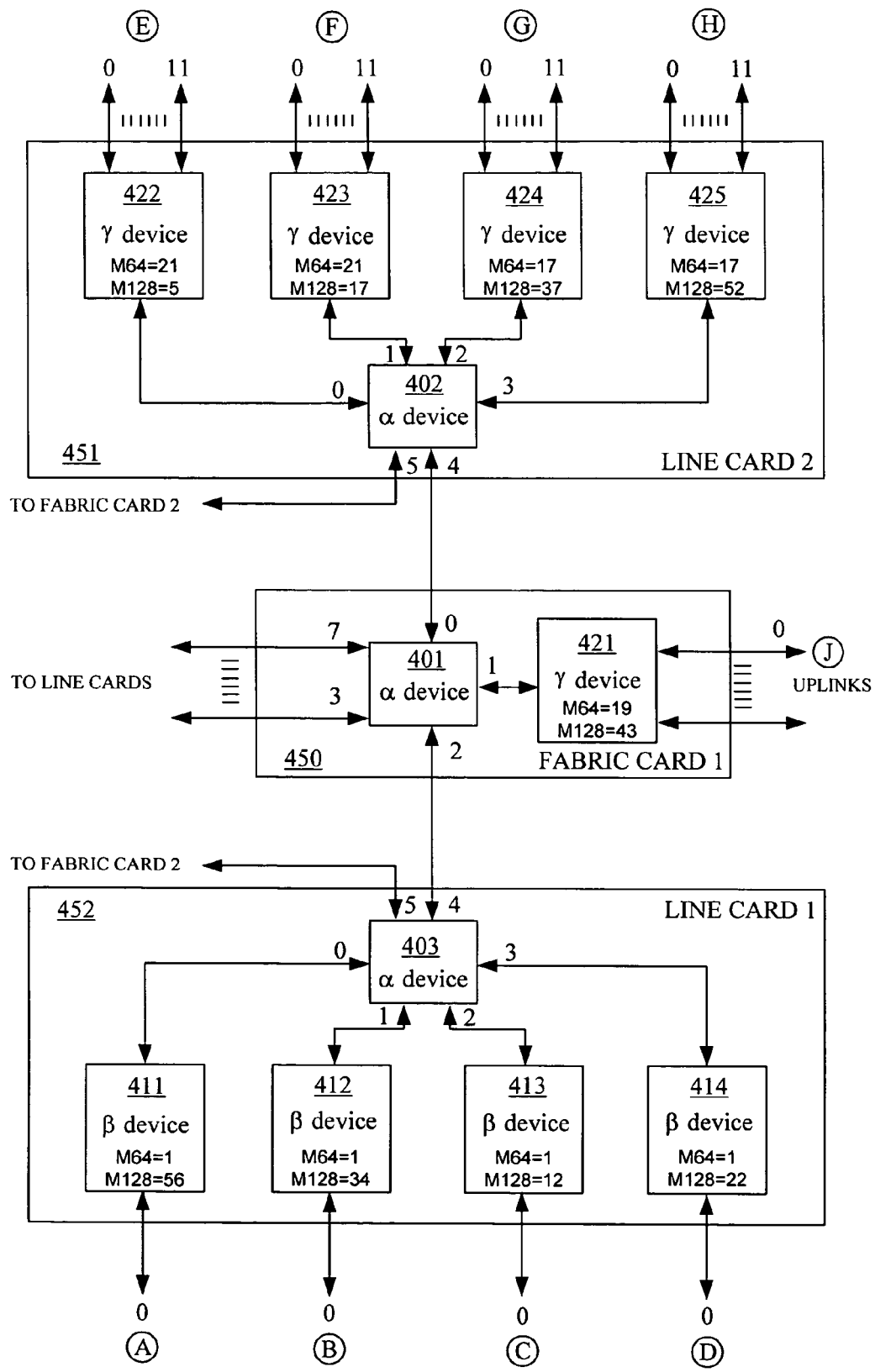
FIG. 4 provides a block diagram illustrating the structure of DLL, according to another embodiment of the present invention.

FIG. 4 illustrates an example showing a simplified version of a chassis configuration, where two line cards are shown, hosting β devices 411-414 on one card 452 and γ devices 422-425 on the other 451. In the examples that follow, the β and γ devices are legacy devices and the α devices 401-403 are the newer devices. Line card 1 452, in this example, hosts four β devices, and line card 2 451 hosts four γ devices. Each of the line cards connects to the fabric cards (fabric redundancy) 450 using a local α device 401-403. The module id and port translations occur in this local α device. The β and γ devices are also referred to as 'leaf devices', to indicate that they connect to the front panel ports.

In the following example, for illustration purposes translation is performed at the ports connected to the γ leaf devices on Line Card 2, although the MODIDs chosen were less than 64 (up which the γ devices can support). Optionally, at these ports and the chosen 128 space values, the translation could be turned off at these ports on α device 402.

Upon initialization the MAC address tables in all the leaf devices are empty. All ports are in the same VLAN of V1. The module id and port number associated with a MAC address is represented as VLAN_ID,MAC_Address [modid,port] in the following discussion.

With respect to programming, for all leaf devices, the local module id is assigned, MYMODID to be 0 in their respective CONFIG and ICONFIG registers. The programming of the later devices is accomplished according to the tables below:

TABLE 6

MODMAP_CTRL Register

| Field | Port 0 | Port 1 | Port 2 | Port 3 | Port 4 | Port 5 | Port 6 | Port 7 |
|---|---|---|---|---|---|---|---|---|
| α Device 403, on line card 1 | | | | | | | | |
| ING_MAP_EN | 1 | 1 | 1 | 1 | 0 | 0 | 0 | 0 |
| EGR_MAP_EN | 1 | 1 | 1 | 1 | 0 | 0 | 0 | 0 |
| MODID_OFFSET | 56 | 34 | 12 | 22 | x | x | x | x |

TABLE 6-continued

MODMAP_CTRL Register

| Field | Port 0 | Port 1 | Port 2 | Port 3 | Port 4 | Port 5 | Port 6 | Port 7 |
|---|---|---|---|---|---|---|---|---|
| α Device 402, on line card 2 | | | | | | | | |
| ING_MAP_EN | 1 | 1 | 1 | 1 | 0 | 0 | 0 | 0 |
| EGR_MAP_EN | 1 | 1 | 1 | 1 | 0 | 0 | 0 | 0 |
| MODID_OFFSET | 5 | 17 | 37 | 52 | x | x | x | x |
| α Device 401, on fabric card 1 | | | | | | | | |
| ING_MAP_EN | 0 | 1 | 0 | 0 | 0 | 0 | 0 | 0 |
| EGR_MAP_EN | 0 | 1 | 0 | 0 | 0 | 0 | 0 | 0 |
| MODID_OFFSET | x | 43 | x | x | x | x | x | x |

TABLE 7

VID Memory

| Index | Field | Device 402 | Device 401 | Device 403 |
|---|---|---|---|---|
| 1 | VIDBITMAP | 0x1FE | 0x1FE | 0x1FE |

TABLE 8

UC Memory

| Index | Field | Device 403 | Device 402 | Device 401 |
|---|---|---|---|---|
| 56 | UCBITMAP | 0x002 | 0x020 | 0x008 |
| 34 | UCBITMAP | 0x004 | 0x020 | 0x008 |
| 12 | UCBITMAP | 0x008 | 0x020 | 0x008 |
| 22 | UCBITMAP | 0x010 | 0x020 | 0x008 |
| 5 | UCBITMAP | 0x020 | 0x002 | 0x002 |
| 17 | UCBITMAP | 0x020 | 0x004 | 0x002 |
| 37 | UCBITMAP | 0x020 | 0x008 | 0x002 |
| 52 | UCBITMAP | 0x020 | 0x010 | 0x002 |
| 43 | UCBITMAP | 0x020 | 0x020 | 0x004 |

TABLE 9

ING_MOD_MAP Memory

| Device: | | 403 | | | | 402 | | | | 401 |
|---|---|---|---|---|---|---|---|---|---|---|
| Index | Field | Port 0 | Port 1 | Port 2 | Port 3 | Port 0 | Port 1 | Port 2 | Port 3 | Port 0 |
| 1 | MOD_A | 56 | 56 | 56 | 56 | 56 | 56 | 56 | 56 | 56 |
| 1 | MOD_B | 34 | 34 | 34 | 34 | 34 | 34 | 34 | 34 | 34 |
| 1 | MOD_C | 12 | 12 | 12 | 12 | 12 | 12 | 12 | 12 | 12 |
| 1 | MOD_D | 22 | 22 | 22 | 22 | 22 | 22 | 22 | 22 | 22 |
| 1 | PORTOFF_A | 0 | 0 | 0 | 0 | 0 | 0 | 0 | 0 | 0 |
| 1 | PORTOFF_B | 1 | 1 | 1 | 1 | 1 | 1 | 1 | 1 | 1 |
| 1 | PORTOFF_C | 2 | 2 | 2 | 2 | 2 | 2 | 2 | 2 | 2 |
| 1 | PORTOFF_D | 3 | 3 | 3 | 3 | 3 | 3 | 3 | 3 | 3 |
| 1 | THRESH_A | 0 | 0 | 0 | 0 | 0 | 0 | 0 | 0 | 0 |
| 1 | THRESH_B | 1 | 1 | 1 | 1 | 1 | 1 | 1 | 1 | 1 |
| 1 | THRESH_C | 2 | 2 | 2 | 2 | 2 | 2 | 2 | 2 | 2 |
| 21 | MOD_A | 5 | 5 | 5 | 5 | 5 | 5 | 5 | 5 | 5 |
| 21 | MOD_B | 17 | 17 | 17 | 17 | 17 | 17 | 17 | 17 | 17 |
| 21 | MOD_C | x | x | x | x | x | x | x | x | x |
| 21 | MOD_D | x | x | x | x | x | x | x | x | x |
| 21 | PORTOFF_A | 0 | 0 | 0 | 0 | 0 | 0 | 0 | 0 | 0 |
| 21 | PORTOFF_B | 14 | 14 | 14 | 14 | 14 | 14 | 14 | 14 | 14 |
| 21 | PORTOFF_C | x | x | x | x | x | x | x | x | x |
| 21 | PORTOFF_D | x | x | x | x | x | x | x | x | x |
| 21 | THRESH_A | 13 | 13 | 13 | 13 | 13 | 13 | 13 | 13 | 13 |
| 21 | THRESH_B | 27 | 27 | 27 | 27 | 27 | 27 | 27 | 27 | 27 |
| 21 | THRESH_C | 0 | 0 | 0 | 0 | 0 | 0 | 0 | 0 | 0 |
| 17 | MOD_A | 37 | 37 | 37 | 37 | 37 | 37 | 37 | 37 | 37 |
| 17 | MOD_B | 52 | 52 | 52 | 52 | 52 | 52 | 52 | 52 | 52 |
| 17 | MOD_C | x | x | x | x | x | x | x | x | x |
| 17 | MOD_D | x | x | x | x | x | x | x | x | x |
| 17 | PORTOFF_A | 0 | 0 | 0 | 0 | 0 | 0 | 0 | 0 | 0 |
| 17 | PORTOFF_B | 14 | 14 | 14 | 14 | 14 | 14 | 14 | 14 | 14 |
| 17 | PORTOFF_C | x | x | x | x | x | x | x | x | x |
| 17 | PORTOFF_D | x | x | x | x | x | x | x | x | x |
| 17 | THRESH_A | 13 | 13 | 13 | 13 | 13 | 13 | 13 | 13 | 13 |
| 17 | THRESH_B | 27 | 27 | 27 | 27 | 27 | 27 | 27 | 27 | 27 |
| 17 | THRESH_C | 0 | 0 | 0 | 0 | 0 | 0 | 0 | 0 | 0 |

TABLE 9-continued

ING_MOD_MAP Memory

| | | Device: | 403 | | | | 402 | | | | 401 |
|---|---|---|---|---|---|---|---|---|---|---|---|
| Index | Field | | Port 0 | Port 1 | Port 2 | Port 3 | Port 0 | Port 1 | Port 2 | Port 3 | Port 0 |
| 19 | MOD_A | | 43 | 43 | 43 | 43 | 43 | 43 | 43 | 43 | 37 |
| 19 | MOD_B | | x | x | x | x | x | x | x | x | x |
| 19 | MOD_C | | x | x | x | x | x | x | x | x | x |
| 19 | MOD_D | | x | x | x | x | x | x | x | x | x |
| 19 | PORTOFF_A | | 0 | 0 | 0 | 0 | 0 | 0 | 0 | 0 | 0 |
| 19 | PORTOFF_B | | x | x | x | x | x | x | x | x | x |
| 19 | PORTOFF_C | | x | x | x | x | x | x | x | x | x |
| 19 | PORTOFF_D | | x | x | x | x | x | x | x | x | x |
| 19 | THRESH_A | | 13 | 13 | 13 | 13 | 13 | 13 | 13 | 13 | 13 |
| 19 | THRESH_B | | 0 | 0 | 0 | 0 | 0 | 0 | 0 | 0 | 0 |
| 19 | THRESH_C | | 0 | 0 | 0 | 0 | 0 | 0 | 0 | 0 | 0 |

Values in ING_MOD_MAP tables on α devices 402 and 403 for ports 4 through 7, and on α device 401 for ports 0, 2 through 7 are not important as mapping is disabled on these ports and hence are not shown above or for TABLE 10 below. Values in THRESH_A through C must be programmed to '0' if they are not used, to defeat successful comparison.

TABLE 10

EGR_MOD_MAP Memory

| | | Device: | 403 | | | | 402 | | | | 401 |
|---|---|---|---|---|---|---|---|---|---|---|---|
| Index | Field | | Port 0 | Port 1 | Port 2 | Port 3 | Port 0 | Port 1 | Port 2 | Port 3 | Port 0 |
| 56 | MOD | | 0 | 1 | 1 | 1 | 1 | 1 | 1 | 1 | 1 |
| 56 | PORTOFF | | 0 | 0 | 0 | 0 | 0 | 0 | 0 | 0 | 0 |
| 34 | MOD | | 1 | 0 | 1 | 1 | 1 | 1 | 1 | 1 | 1 |
| 34 | PORTOFF | | 1 | 0 | 1 | 1 | 1 | 1 | 1 | 1 | 1 |
| 12 | MOD | | 1 | 1 | 0 | 1 | 1 | 1 | 1 | 1 | 1 |
| 12 | PORTOFF | | 2 | 2 | 0 | 2 | 2 | 2 | 2 | 2 | 2 |
| 22 | MOD | | 1 | 1 | 1 | 0 | 1 | 1 | 1 | 1 | 1 |
| 22 | PORTOFF | | 3 | 3 | 3 | 0 | 3 | 3 | 3 | 3 | 3 |
| 5 | MOD | | 21 | 21 | 21 | 21 | 0 | 21 | 21 | 21 | 21 |
| 5 | PORTOFF | | 0 | 0 | 0 | 0 | 0 | 0 | 0 | 0 | 0 |
| 17 | MOD | | 21 | 21 | 21 | 21 | 21 | 0 | 21 | 21 | 21 |
| 17 | PORTOFF | | 14 | 14 | 14 | 14 | 14 | 0 | 14 | 14 | 14 |
| 37 | MOD | | 17 | 17 | 17 | 17 | 17 | 17 | 0 | 17 | 17 |
| 37 | PORTOFF | | 0 | 0 | 0 | 0 | 0 | 0 | 0 | 0 | 0 |
| 52 | MOD | | 17 | 17 | 17 | 17 | 17 | 17 | 17 | 0 | 17 |
| 52 | PORTOFF | | 14 | 14 | 14 | 14 | 14 | 14 | 14 | 0 | 14 |
| 43 | MOD | | 19 | 19 | 19 | 19 | 19 | 19 | 19 | 19 | 0 |
| 43 | PORTOFF | | 0 | 0 | 0 | 0 | 0 | 0 | 0 | 0 | 0 |

The specific actions made to accomplish the remapping are discussed in greater detail below. Station A sends a packet to Station E (unknown unicast). First, a source address A is learned on β device 411 as V1,A[0,0]. Note the modid for the β devices are in 32-space. Next, since destination address E is not found in its MAC address table, the packet is flooded and sent out on the HIGIG port of device 411. The following values are set:

64_SRC_MODID=0;
64_SRC_PORT_TGID=0;
64_DST_MODID=x;
64_DST_PORT=x.

Next, at Port 0 of the 403 device, 64-space to 128-space conversion occurs. SRC_MODID is changed using its MOD-MAP_CTRL.MODID_OFFSET value and SRC_PORT_TGID is unchanged. DST_MODID and DST_PORT in the HIGIG header are not changed, as this packet is an unknown unicast. The following values are set:

128_SRC_MODID=56;  64_SRC_MODID+MOD-MAP_CTRL(0).MODID_OFFSET;
128_SRC_PORT_TGID=0; 64_SRC_PORT_TGID;
128_DST_MODID=x; unchanged;
128_DST_PORT=x; unchanged.

Thereafter, address A is now represented as V1,A[56,0] in 128-space. The packet is flooded to all ports of VLAN 1 in the 403 device as an unknown unicast address. On egress ports 1, 2 and 3 of the 403 device, connected to legacy devices (412-414) 128-space to 64-space translation occurs. 128_SRC_MODID and 128_SRC_PORT_TGID are mapped to 64-space, by indexing the EGR_MOD_MAP table at index 56. It is noted that the SRC_PORT_TGID is not mapped if it indicates a source trunk group, in which case bit 4 of this field will be set. DST_MODID and DST_PORT are unchanged as this is an unknown unicast packet. Thus, the following values are set:

64_SRC_MODID=1;  EGR_MOD_MAP(port)(56).MOD, port=1, 2 and 3;
64_SRC_PORT_TGID=0;  128_SRC_PORT_TGID+EGR_MOD_MAP(n)(56).PORTOFF;

64_DST_MODID=x; unchanged;
64_DST_PORT=x; unchanged.

Then, address A is now learned as V1,A[1,0] on devices 412-414. On egress Ports 4 and 5 of the 403 device, which are connected to fabric card or non-legacy device, the SRC_MODID and SRC_PORT are not changed, as mapping is disabled on these ports. In the 401 device on Fabric Card 1, on Port 1, translation similar to the above occurs and address A is learned as V1,A[1,0] on device 421. No changes occur in the HIGIG header for packets egressing on all other ports, as mapping is disabled in this device. Similarly, at Port 4 of the 402 device on Line Card 2, no changes occur to the HIGIG header as mapping is disabled on this port. At egress Ports 0 through 3 of the 402 device, connected to legacy devices (422-425), translation occurs as in prior steps. The following values are set:

64_SRC_MODID=1;     EGR_MOD_MAP(port)(56).MOD, port=0, 1, 2 and 3;
    64_SRC_PORT_TGID=0;     128_SRC_PORT_TGID+EGR_MOD_MAP(port)(56).PORTOFF;
    64_DST_MODID=x; unchanged;
    64_DST_PORT=x; unchanged.

Thus, Address A is now learned as V1,A[1,0] on devices 422-425.

In another example, all stations may send a packet to Station E. Using the initialization tables shown above, when all stations send similar packets to E, they will similarly be flooded and learned on all leaf devices. The MAC address tables in the various leaf devices will be as follows in TABLE 11:

TABLE 11

| MAC Address | [MODID, PORT] | | | | | | | | |
|---|---|---|---|---|---|---|---|---|---|
| Device: | 411 | 412 | 413 | 414 | 422 | 423 | 424 | 425 | 421 |
| A | 0,0 | 1,0 | 1,0 | 1,0 | 1,0 | 1,0 | 1,0 | 1,0 | 1,0 |
| B | 1,1 | 0,0 | 1,1 | 1,1 | 1,1 | 1,1 | 1,1 | 1,1 | 1,1 |
| C | 1,2 | 1,2 | 0,0 | 1,2 | 1,2 | 1,2 | 1,2 | 1,2 | 1,2 |
| D | 1,3 | 1,3 | 1,3 | 0,0 | 1,3 | 1,3 | 1,3 | 1,3 | 1,3 |
| E | — | — | — | — | — | — | — | — | — |
| F | 21,25 | 21,25 | 21,25 | 21,25 | 21,25 | 0,11 | 21,25 | 21,25 | 21,25 |
| G | 17,0 | 17,0 | 17,0 | 17,0 | 17,0 | 17,0 | 0,0 | 17,0 | 17,0 |
| H | 17,25 | 17,25 | 17,25 | 17,25 | 17,25 | 17,25 | 17,25 | 0,11 | 17,25 |
| I | 19,0 | 19,0 | 19,0 | 19,0 | 19,0 | 19,0 | 19,0 | 19,0 | 19,0 |

In another example, Station B sends a packet to Station A. The Destination address A gets resolved in device 412 with 64_DST_MODID, 64_DST_PORT of [1,0] and gets forwarded out on its HiGig port. The following values are set:

64_SRC_MODID=0
    64_SRC_PORT_TGID=0
    64_DST_MODID=1
    64_DST_PORT=0

At Port 1 of the 403 device, 64-space to 128-space conversion occurs. SRC_MODID is changed using its MODMAP_CTRL.MODID_OFFSET value. SRC_PORT_TGID is unchanged. Using the ING_MOD_MAP table at index 64_DST_MODID (which is 1), DST_MODID and DST_PORT are also changed. At the index of 1, 64_DST_PORT value of 0, is less than THRESH_A and hence MOD_A and PORTOFF_A are used. The following values are set:

128_SRC_MODID=34;     64_SRC_MODID+MODMAP_CTRL(1).MODID_OFFSET
    128_SRC_PORT_TGID=0; 64_SRC_PORT_TGID
    128_DST_MODID=56;     ING_MOD_MAP(1)(1).MOD_A
    128_DST_PORT=0; 64_DST_PORT-ING_MOD_MAP(1)(1).PORTOFF_A

Thereafter, Address B is now represented as V1,A[34,0] in the 128-space. Packet is sent to Port 0 in the 403 device based on unicast forwarding table lookup, which is based on the new 128_DST_MODID at index 56. On egress Port 0 of the 403 device, 128-space to 64-space translation occurs. 128_SRC_MODID and 128_SRC_PORT_TGID are mapped to 64-space, by indexing the EGR_MOD_MAP table at index 64_SRC_MODID which is 34. DST_MODID is replaced with a 64-space value, by subtracting from 128_DST_MODID the MODMAP_CTRL.MODID_OFFSET value. The following values are set:

64_SRC_MODID=1; EGR_MOD_MAP(0)(34).MOD
    64_SRC_PORT_TGID=1;     128_SRC_PORT_TGID+EGR_MOD_MAP(0)(34).PORTOFF
    64_DST_MODID=0;     128_DST_MODID-MOD_MAP_CTRL(0).MODID_OFFSET
    64_DST_PORT=0; unchanged At device 411, the packet is forwarded to the port connected to station A, using forwarding rules.

According to another example, Station C sends a packet to Station F. Destination address F gets resolved in device 413 with 64_DST_MODID, 64_DST_PORT of [21,25] and gets forwarded out on its HIGIG port. The following values are set:

64_SRC_MODID=0;
    64_SRC_PORT_TGID=0;
    64_DST_MODID=21;
    64_DST_PORT=25.

At Port 2 of device 403, 64-space to 128-space conversion occurs. SRC_MODID is changed using its MODMAP_CTRL.MODID_OFFSET value. SRC_PORT_TGID is unchanged. Using the ING_MOD_MAP table at index 64_DST_MODID (which is 21), DST_MODID and DST_PORT are also changed. At the index of 21, 64_DST_PORT value of 25, is less than THRESH_B and hence MOD_B and PORTOFF_B are used. The following values are set:

128_SRC_MODID=12;     64_SRC_MODID+MODMAP_CTRL(2).MODID_OFFSET
    128_SRC_PORT_TGID=0; 64_SRC_PORT_TGID
    128_DST_MODID=17;     ING_MOD_MAP(2)(21).MOD_B
    128_DST_PORT=11;     64_DST_PORT-ING_MOD_MAP(2)(21).PORTOFF_B

Address B is now represented as V1,A[17,11] in the 128-space. The packet is sent to Port 4 in the 403 device based on unicast forwarding table lookup, which is based on the new 128_DST_MODID at index 17. On egress Port 4 of device 403, translation is disabled and no changes occur. Similarly on Port 2 and Port 0 of device 401, and Port 4 of device 402, no changes occur. On egress Port 1 of device 402, 128-space to 64-space translation occurs. 128_SRC_MODID and 128_SRC_PORT_TGID are mapped to 64-space, by indexing the EGR_MOD_MAP table at index 64_SRC_MODID, which is 12. DST_MODID is replaced with a 64-space value, by subtracting from 128_DST_MODID the MODMAP_CTRL.MODID_OFFSET value. The following values are set:

64_SRC_MODID=1; EGR_MOD_MAP(1)(12).MOD;
    64_SRC_PORT_TGID=2;     128_SRC_PORT_TGID+EGR_MOD_MAP(1)(12).PORTOFF;
    64_DST_MODID=0;     128_DST_MODID-MOD_MAP_CTRL(1).MODID_OFFSET;
    64_DST_PORT=11; unchanged.

At device 423, the packet is forwarded to the port connected to station F, using forwarding rules. In the above example, for illustration purposes translation is performed at the ports connected to the g leaf devices on Line Card 2, although the MODIDs chosen were less than 64 (up which g devices can support). Optionally, at these ports and the chosen 128 space values, the translation could be turned off at these ports on device 402.

Figure 5:
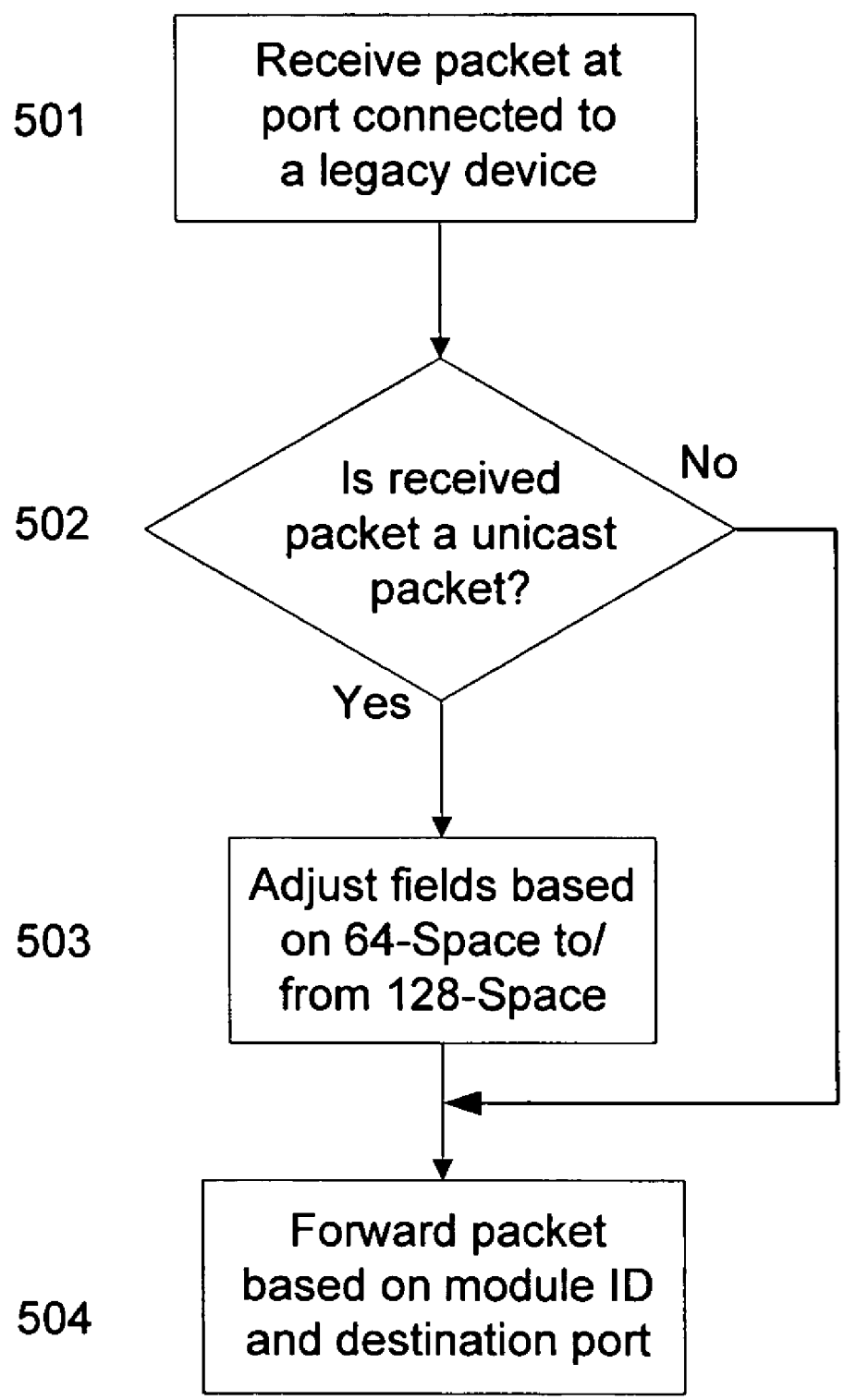
FIG. 5 illustrates a flow chart showing the process of comparing and updating the counters and delay settings in a DLL, according to one embodiment of the present invention.

Additionally, a general method of the instant invention is illustrated in the flowchart of FIG. 5. In step 501, a packet is received at a port connected to a legacy device. It is determined, in step 502, whether the packet is a unicast packet or a multicast or broadcast packet. If the packet is not a unicast packet, then the flow skips step 503 and forwards the packet according to data found in the packet, step 504. If the packet is a unicast packet, step 502, then packet fields are adjusted based on whether the packet is passing from or to 64-space to or from 128-space, in step 503. Thereafter, the flow continues to step 504 and the packet is forwarded according to the adjusted values.

The above-discussed configuration of the invention is, in a preferred embodiment, embodied on a semiconductor substrate, such as silicon, with appropriate semiconductor manufacturing techniques and based upon a circuit layout which would, based upon the embodiments discussed above, be apparent to those skilled in the art. A person of skill in the art with respect to semiconductor design and manufacturing would be able to implement the various modules, interfaces, and tables, buffers, etc. of the present invention onto a single semiconductor substrate, based upon the architectural description discussed above. It would also be within the scope of the invention to implement the disclosed elements of the invention in discrete electronic components, thereby taking advantage of the functional aspects of the invention without maximizing the advantages through the use of a single semiconductor substrate.

Although the invention has been described based upon these preferred embodiments, it would be apparent to those skilled in the art that certain modifications, variations, and alternative constructions would be apparent, while remaining within the spirit and scope of the invention. In order to determine the metes and bounds of the invention, therefore, reference should be made to the appended claims.

The invention claimed is:

1. A method of adjusting fields of a datagram in the handling of the datagram in a network device, said method comprising:
   receiving a datagram, with the datagram having at least module identifier fields and port identifier fields, at a port of a network device;
   determining whether the received datagram is a unicast datagram;
   adding or subtracting an offset value to at least one of the module identifier fields and at least one of the port identifier fields of the datagram based on data registers in the network device when the received datagram is a unicast datagram; and
   forwarding the datagram based on the module and port identifier fields of the datagram;
   wherein the port of the network device is connected to a legacy device, where a size of each of the module identifier fields and the port identifier fields handled by the legacy device is smaller than a size of the module identifier fields and port identifier fields handled by the network device.

2. A method as recited in claim 1, wherein the module identifier fields comprise a destination module identifier field and a source module identifier field and the adding or subtracting comprises adding or subtracting the offset value to at least one of the destination module identifier field and the source module identifier field based on whether the datagram is received from the legacy device or destined for the legacy device.

3. A method as recited in claim 1, wherein the port identifier fields comprise a destination port identifier field and a source port identifier field and the adding or subtracting comprises adding or subtracting the offset value to at least one of the destination port identifier field and the source port identifier field based on whether the datagram is received from the legacy device or destined for the legacy device.

4. A method as recited in claim 1, wherein the legacy device has a capacity to address a maximum of 32 modules and the adjusting of the module and port identifier fields of the datagram is performed to comply with the maximum address capacity of the legacy device.

5. A method as recited in claim 1, wherein the port of the network device comprises a high speed port controlled through a high speed interface used to interconnect network devices together and the forwarding of the datagram comprises forwarding the datagram through the high speed interface to an interconnected legacy network device.

6. A method as recited in claim 1, wherein the datagram comprises a data packet and the determining of whether the received datagram is a unicast datagram comprises determining whether the received packet is a unicast packet through examination of a field in a header of the data packet.

7. A network device configured to adjust fields of a datagram in the handling of the datagram, comprising:
   receiving means for receiving a datagram, with the datagram having at least module identifier fields and port identifier fields, at a port of a network device;
   determining means for determining whether the received datagram is a unicast datagram;
   adjusting means for adding or subtracting an offset value to at least one of the module identifier fields and at least one of the port identifier fields of the datagram based on data registers in the network device when the received datagram is a unicast datagram; and
   forwarding means for forwarding the datagram based on the module and port identifier fields of the datagram;
   wherein the port of the network device is connected to a legacy device, where a size of each of the module identifier fields and the port identifier fields handled by the legacy device is smaller than a size of the module identifier fields and port identifier fields handled by the network device.

8. A network device as recited in claim 7, wherein the module identifier fields comprise a destination module identifier field and a source module identifier field and the adjusting means comprises adding or subtracting means for adding or subtracting the offset value to at least one of the destination module identifier field and the source module identifier field based on whether the datagram is received from the legacy device or destined for the legacy device.

9. A network device as recited in claim 7, wherein the port identifier fields comprise a destination port identifier field and a source port identifier field and the adjusting means comprises adding or subtracting means for adding or subtracting the offset value to at least one of the destination port identifier field and the source port identifier field by an offset value based on whether the datagram is received from the legacy device or destined for the legacy device.

10. A network device as recited in claim 7, wherein the legacy device has a capacity to address a maximum of 32 modules and the adjusting means is configured to adjust the module and port identifier fields to comply with the maximum address capacity of the legacy device.

11. A network device as recited in claim 7, wherein the port of the network device comprises a high speed port controlled through a high speed interface used to interconnect network devices together and the forwarding means comprises means for forwarding the datagram through the high speed interface to an interconnected legacy network device.

12. A network device as recited in claim 7, wherein the datagram comprises a data packet and the determining means comprises means for determining whether the received packet is a unicast packet through examination of a field in a header of the data packet.

13. A network device configured to adjust fields of a datagram in the handling of the datagram, comprising:
at least one data port interface, in communication with at least a legacy port, for receiving and forwarding datagrams, with each of the datagrams having at least module identifier fields and port identifier fields;
a datagram reader for determining whether the received datagrams are unicast datagrams; and
a datagram writer for writing adjusted module and port identifier fields to the datagram by adding or subtracting a module identifier offset value and adding or subtracting a port identifier offset value to an original module identifier field and an original port identifier field, respectively, when the received datagrams are determined to be unicast datagrams;
wherein the forwarding of the datagrams is based on the adjusted module and port identifier fields of the datagram and wherein the legacy port is connected to a legacy device, where a size of each of the module identifier fields and the port identifier fields handled by the legacy device is smaller than a size of the module identifier fields and port identifier fields handled by the network device.

14. A network device as recited in claim 13, wherein the module identifier fields comprise a destination module identifier field and a source module identifier field and the datagram writer is configured to write an the adjusted value of at least one of the destination module identifier field and the source module identifier field,
where the adjusted value comprises an original value adjusted by adding or subtracting the offset value to or from the original value based on whether a particular datagram is received from the legacy device or destined for the legacy device.

15. A network device as recited in claim 13, wherein the port identifier fields comprise a destination port identifier field and a source port identifier field and the datagram writer is configured to write an adjusted value of at least one of the destination port identifier field and the source port identifier field, where the adjusted value comprises an original value adjusted by adding or subtracting the offset value to or from the original value based on whether a particular datagram is received from the legacy device or destined for the legacy device.

16. A network device as recited in claim 13, wherein the legacy device has a capacity to address a maximum of 32 modules and the datagram writer is configured to write adjusted module and port identifier fields to comply with the maximum address capacity of the legacy device.

17. A network device as recited in claim 13, wherein the legacy port comprises a high speed port and the at least one data port interface comprises a high speed interface used to interconnect network devices together.

18. A network device as recited in claim 13, wherein the datagrams comprises data packets and the datagram reader is configured to determine whether the received packets are unicast packets through examination of fields in headers of the data packets.

19. A network device as recited in claim 13, wherein a datagram is received from a legacy device, the module identifier fields comprise a destination module identifier field and a source module identifier field and the network device further includes circuitry configured to:
determine the module identifier offset;
determine an adjusted source module identifier field as a sum of an original source module identifier field and the module identifier offset;
lookup an original destination module identifier field in a table to select an adjusted destination module identifier field and a port offset; and
determine an adjusted destination port identifier field calculated as the difference between an original source port identifier field and the port offset.

20. A network device as recited in claim 13, wherein a datagram is destined for a legacy device, the module identifier fields comprise a destination module identifier field and a source module identifier field and the network device further includes circuitry configured to:
determine the module identifier offset;
determine an adjusted destination module identifier field as a sum of an original destination module identifier field and the module identifier offset;
lookup an original source module identifier field in a table to select an adjusted source module identifier field and a port offset; and
determine an adjusted source port identifier field calculated as a sum of an original source port identifier field and the port offset.

* * * * *

UNITED STATES PATENT AND TRADEMARK OFFICE
CERTIFICATE OF CORRECTION

PATENT NO.        : 7,778,245 B2                                                         Page 1 of 1
APPLICATION NO.   : 10/985031
DATED             : August 17, 2010
INVENTOR(S)       : Kevin Cameron et al.

It is certified that error appears in the above-identified patent and that said Letters Patent is hereby corrected as shown below:

On the Title page, in column 2, in "Assistant Examiner", line 1, delete "Salvadore E Rivas" and insert -- Salvador E Rivas --, therefor.

In column 19, line 41, in claim 14, before "adjusted" delete "the".

Signed and Sealed this

Twenty-first Day of December, 2010

David J. Kappos
*Director of the United States Patent and Trademark Office*